US012015231B2

(12) United States Patent
Kloppenburg

(10) Patent No.: US 12,015,231 B2
(45) Date of Patent: Jun. 18, 2024

(54) CONNECTION TERMINAL AND CONNECTION TERMINAL BLOCK

(71) Applicant: Phoenix Contact GmbH & Co. KG, Blomberg (DE)

(72) Inventor: Christian Kloppenburg, Bueren Wewelsburg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 330 days.

(21) Appl. No.: 17/424,905

(22) PCT Filed: Jan. 14, 2020

(86) PCT No.: PCT/EP2020/050789
§ 371 (c)(1),
(2) Date: Jul. 22, 2021

(87) PCT Pub. No.: WO2020/160879
PCT Pub. Date: Aug. 13, 2020

(65) Prior Publication Data

US 2022/0109254 A1 Apr. 7, 2022

(30) Foreign Application Priority Data

Feb. 4, 2019 (DE) ..................... 10 2019 102 646.6

(51) Int. Cl.
*H01R 4/48* (2006.01)
*H01R 9/24* (2006.01)

(52) U.S. Cl.
CPC ......... *H01R 4/48365* (2023.08); *H01R 4/489* (2013.01); *H01R 9/24* (2013.01)

(58) Field of Classification Search
CPC ...... H01R 4/48365; H01R 4/489; H01R 9/24; H01R 4/48455
See application file for complete search history.

(56) References Cited

U.S. PATENT DOCUMENTS 7,666,037 B2 * 2/2010 Diessel ............. H01R 13/7034 439/94
9,680,237 B2 6/2017 Aporius et al.
(Continued)

FOREIGN PATENT DOCUMENTS

CN 205029030 U 2/2016
CN 107978876 A 5/2018
(Continued)

*Primary Examiner* — Briggitte R. Hammond
(74) *Attorney, Agent, or Firm* — LEYDIG, VOIT & MAYER, LTD

(57) ABSTRACT

A connection terminal for connecting an electric conductor includes: a housing; a current bar arranged in the housing; a clamping spring arranged in the housing for clamping the conductor to be connected against the current bar; and an actuation element for transferring the clamping spring into a clamping position and into an open position. The actuation element has a rotation element mounted about a first axis of rotation and a lever element mounted about a second axis of rotation. The clamping spring is mounted on the rotation element and the clamping spring follows a rotational movement of the rotation element at least in regions. The rotation element engages with the lever element such that during a rotational movement of the lever element about the second axis of rotation, the rotation element rotates about the first axis of rotation arranged spaced apart from the second axis of rotation.

10 Claims, 5 Drawing Sheets

(56) References Cited

U.S. PATENT DOCUMENTS

| | | | |
|---|---|---|---|
| 10,193,245 B2 | 1/2019 | Lorenschat et al. | |
| 10,230,179 B2 | 3/2019 | Wilinski | |
| 10,283,880 B2 * | 5/2019 | Kettern | H01R 4/40 |

FOREIGN PATENT DOCUMENTS

| | | | |
|---|---|---|---|
| DE | 102012110895 | B4 | 5/2014 |
| DE | 202013101582 | U | 7/2014 |
| DE | 102014114026 | A1 | 3/2016 |
| DE | 102015100823 | A1 | 7/2016 |
| DE | 102015119342 | A1 | 5/2017 |
| DE | 102016118331 | A1 | 3/2018 |
| JP | 2002298942 | A | 10/2002 |

* cited by examiner

CONNECTION TERMINAL AND CONNECTION TERMINAL BLOCK

CROSS-REFERENCE TO PRIOR APPLICATIONS

This application is a U.S. National Phase application under 35 U.S.C. § 371 of International Application No. PCT/EP2020/050789, filed on Jan. 14, 2020, and claims benefit to German Patent Application No. DE 10 2019 102 646.6, filed on Feb. 4, 2019. The International Application was published in German on Aug. 13, 2020 as WO 2020/160879 under PCT Article 21(2).

FIELD

The invention relates to a connection terminal for connecting an electric conductor. The invention furthermore relates to a connection terminal block having at least two connection terminals arranged in a row.

BACKGROUND

DE 10 2012 110 895 B4 discloses a connection terminal that has a housing, a current bar arranged in the housing and a clamping spring for clamping the conductor to be connected against the current bar. In order to transfer the clamping spring into a clamping position and an open position, the connection terminal has an actuation element that is rotatably mounted in the housing and that can be rotated about an axis of rotation by means of a tool that can be inserted into the housing. On its clamping leg, the clamping spring has a spring arm that extends from the clamping leg and is hooked behind a cam formed on the actuation element, so that, during a rotational movement of the actuation element, a force is applied via the spring arm to the clamping leg of the clamping spring, in order to transfer the clamping spring into the clamping position and the open position.

SUMMARY

In an embodiment, the present invention provides a connection terminal for connecting an electric conductor, comprising: a housing; a current bar arranged in the housing; a clamping spring arranged in the housing configured to clamp the conductor to be connected against the current bar; and an actuation element configured to transfer the clamping spring into a clamping position and into an open position, wherein the actuation element has a rotation element mounted about a first axis of rotation and a lever element mounted about a second axis of rotation, wherein the clamping spring is mounted on the rotation element and the clamping spring is configured to follow a rotational movement of the rotation element at least in regions, and wherein the rotation element is configured to engage with the lever element such that during a rotational movement of the lever element about the second axis of rotation, the rotation element is configured to rotate about the first axis of rotation arranged spaced apart from the second axis of rotation, and the clamping spring is configured to be transferred into the open position and into the clamping position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
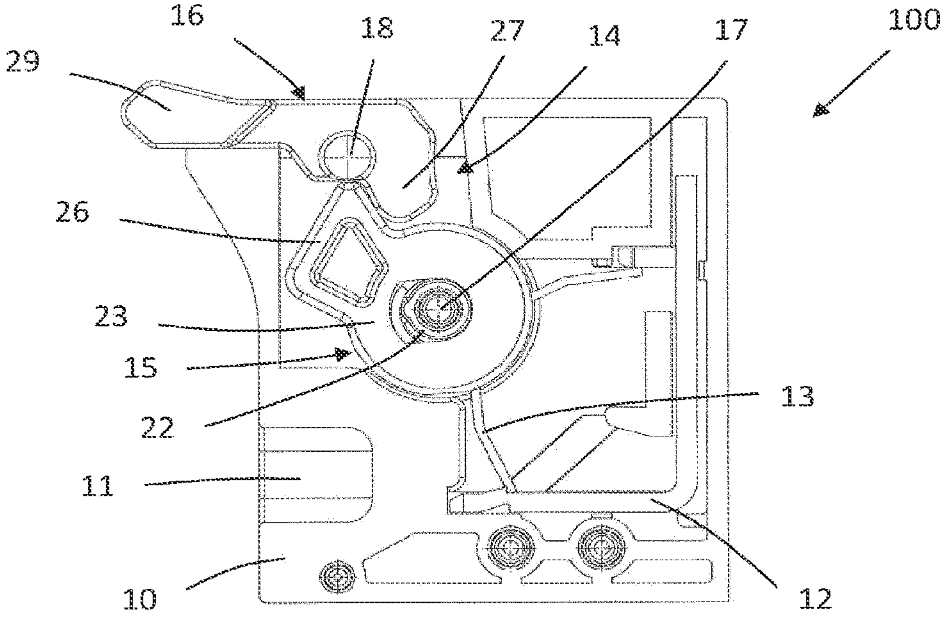
FIG. 1 a schematic representation of a connection terminal according to the invention in a clamping position, FIG. 2 a schematic representation of the connection terminal shown in FIG. 1 in an intermediate position, FIG. 3 a schematic representation of the connection terminal shown in FIG. 1 in an open position, FIG. 4 a schematic sectional view of the connection terminal shown in FIG. 1 in the clamping position, FIG. 5 a schematic sectional view of the connection terminal shown in FIG. 3 in the open position, FIG. 6 a schematic sectional detailed view of the connection terminal shown in FIG. 1, FIG. 7 a schematic representation of a further connection terminal according to the invention in a clamping position, FIG. 8 a schematic representation of the connection terminal shown in FIG. 7 in the intermediate position, FIG. 9 a schematic representation of the connection terminal shown in FIG. 1, having a side part closing the housing of the connection terminal, and FIG. 10 a schematic representation of a connection terminal block according to the invention.

In an embodiment, the present invention provides a connection terminal and a connection terminal block, which are characterized by a simplified structure and are easy to operate for a user.

The connection terminal according to the invention has a housing, a current bar arranged in the housing, a clamping spring arranged in the housing for clamping the conductor to be connected against the current bar, and an actuation element for transferring the clamping spring into a clamping position and into an open position, wherein the actuation element has a rotation element mounted about a first axis of rotation and a lever element mounted about a second axis of rotation, wherein the clamping spring is mounted on the rotation element and the clamping spring follows a rotational movement of the rotation element, and wherein the rotation element engages with the lever element in such a way that, during a rotational movement of the lever element about the second axis of rotation, the rotation element is rotated about the first axis of rotation arranged spaced apart from the second axis of rotation and the clamping spring can be transferred into the open position and into the clamping position.

The connection terminal according to the invention is characterized in that the actuation element for actuating the clamping spring is now formed in two parts, in that the actuation element is formed from a lever element and a rotation element. The lever element and the rotation element are two separate components that interact with one another during actuation of the clamping spring. The lever element and the rotation element each have a separate axis of rotation, so that the actuation element has two different axes of rotation that are arranged spaced apart from one another. The actuation element can be actuated by a user directly via the lever element, so that an additional tool for actuating the actuation element is not necessary. The clamping spring is mounted on the rotation element of the actuation element, so that the clamping spring can follow the rotational movement of the rotation element at least in regions, which means that at least a part of the clamping spring can be rotated together with the rotation element. For the transfer into the open position and into the clamping position, the clamping spring can thus be rotated at least in regions together with the rotation element about the first axis of rotation. This makes a highly compact arrangement of the clamping spring with the actuation element possible. In addition, the movement of the actuation element can be transmitted to the clamping spring without frictional losses, in order to transfer the clamping spring into the open position and the clamping position.

The clamping spring is preferably mounted on the rotation element in such a way that the clamping spring extends around the first axis of rotation. The clamping spring can thus be positioned on the rotation element in such a way that the clamping spring encompasses the axis of rotation. For example, the clamping spring can be shaped in such a way that the clamping spring encompasses the axis of rotation in a U shape. The clamping spring can thus be positioned particularly closely to the axis of rotation of the rotation element, so that the rotational movement of the rotation element can be transmitted directly to the clamping spring.

The clamping spring is preferably designed as a leg spring, which can have a clamping leg, a retaining leg and an arc-shaped section for connecting the clamping leg to the retaining leg. With the arc-shaped section, the clamping spring can extend around the axis of rotation of the rotation element in that the arc-shaped section encompasses the axis of rotation. The clamping leg and the retaining leg are preferably arranged relative to one another in such a way that they form a V shape. By means of the clamping leg, the clamping spring can clamp the conductor to be connected against the current bar. By means of the retaining leg, the clamping spring can be supported on the housing of the connection terminal or on a portion of the current bar. The rotation element can have a driver that can press on the clamping leg of the clamping spring during a rotational movement of the rotation element, so that the clamping spring can follow the rotational movement of the rotation element in that the clamping leg of the clamping spring is rotated or pressed in the direction of the retaining leg of the clamping spring by the rotational movement of the driver during a transfer from the clamping position into the open position, so that the distance between the clamping leg and the retaining leg is reduced and the clamping spring is tensioned. The retaining leg preferably remains in its position when the clamping spring is transferred into the open position and into the clamping position.

The rotation element can have an inner part and an outer part. The inner part can be arranged radially inside the rotation element and the outer part can be arranged radially outside the rotation element, so that the outer part can radially surround the inner part. The inner part can be fixed in place on the first axis of rotation, whereas the outer part can be designed to be rotatable relative to the inner part, and the rotation element can thus be rotated about the first axis of rotation via the outer part of the rotation element. Via its arc-shaped section, the clamping spring can be positioned and fixed in place on the inner part. The driver for actuating the clamping leg of the clamping spring can be formed on the outer part.

It is preferably provided that the lever element and the rotation element interact in such a way that, during a rotational movement of the lever element in a direction of rotation, the rotation element rotates about a direction of rotation opposite the rotational movement of the lever element. During an actuation of the actuation element, the lever element and the rotation element are thus preferably rotated in opposite directions, so that a reversal of movement takes place between the lever element and the rotation element.

The lever element can be positioned in the connection terminal in such a way that the second axis of rotation of the lever element can be displaceably mounted in the housing. During a transfer into the clamping position and into the open position, the lever element can thus carry out not only a rotational movement about the second axis of rotation but also, simultaneously, a translational movement within the housing, so that the second axis of rotation of the lever element can be displaceable relative to the first axis of rotation of the rotation element within the housing. On the housing itself, a guide contour can be formed within which the second axis of rotation can be displaceable, so that the displacement movement of the second axis of rotation can take place in a controlled manner.

In order to be able to achieve an interaction of the rotation element with the lever element, the rotation element can have a lug that can engage with a lug of the lever element. The lug of the lever element can press on the lug of the rotation element, so that, during a rotational movement of the lever element, the lug of the lever element exerts a force on the lug of the rotation element, so that the rotation element also carries out a rotational movement. The two lugs can be designed in such a way that, during a transfer into the open position and into the clamping position, the lug of the lever element can slide along the lug of the rotation element, in order to transmit the rotational movement of the lever element to the rotation element.

As an alternative to the lugs, it is possible for the rotation element to have a plurality of teeth and for the lever element to have a plurality of teeth, wherein the teeth of the rotation element can engage with the teeth of the lever element. Gearing can thus be formed between the lever element and the rotation element, in order to be able to transmit the rotational movement of the lever element to the rotation element. A force/path transmission can thus be formed between the lever element and the rotation element. In addition, a highly controlled guidance between the lever element and the rotation element can be formed by the gearing.

It can preferably be provided that, in the open position, the actuation element, and in particular the lever element, automatically remains in its position, without a user having to hold the actuation element in the open position. In order to achieve this, it is preferably provided that the lever element can be rotated by an angle $\alpha>90°$.

In order to be able to facilitate the actuation of the actuation element for a user, the lever element can have a handle region that projects out of the housing. The lever element and the handle region are preferably designed in such a way that, in the clamping position, the handle region extends in parallel to the conductor insertion opening in the housing.

The connection terminal can be designed, for example, as a series terminal that can be snapped onto a support rail. In this case, the connection terminal can have a snap-on foot by means of which the connection terminal can be snapped onto a support rail.

In an embodiment, the present invention provides a means of a connection terminal block that has at least two connection terminals that are arranged in a row and that can be formed and developed as described above. According to the invention, the connection terminals can thus be arranged in a row to form a block. If the connection terminals are designed as series terminals, the connection terminal block can form a series terminal block.

The invention is explained in more detail below with reference to the accompanying drawings based on preferred embodiments.

FIG. 1 shows a connection terminal 100 for connecting an electric conductor. The connection terminal 100 has a housing 10 that can be made of an insulating material. A conductor insertion opening 11 for inserting a conductor to be connected is formed in the housing 10.

A current bar 12 against which the conductor to be connected can be clamped by means of a clamping spring 13, is arranged in the housing 10. In the embodiment shown here, the current bar 12 is L-shaped.

Figure 3:
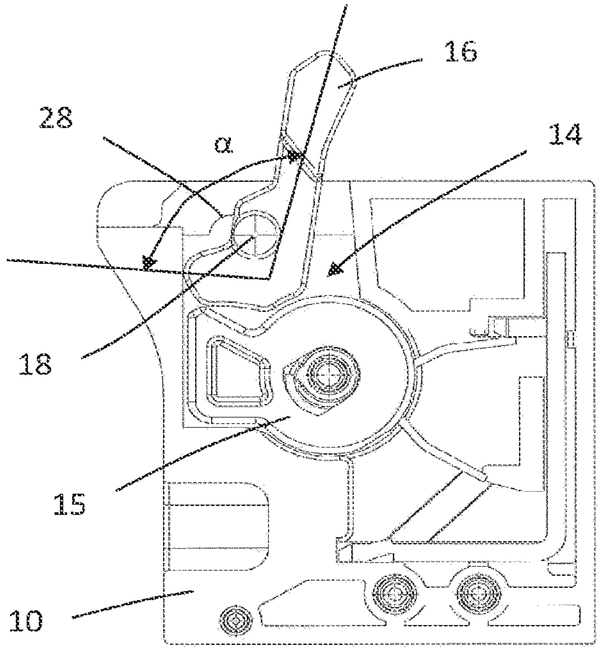

For transferring the clamping spring 13 into a clamping position as shown in FIG. 1, in which a conductor can be clamped against the current bar 12 by means of the clamping spring 13, and into an open position as shown in FIG. 3, in which the clamping spring 13 is spaced apart from the current bar 12 and a conductor can be inserted into or removed from the region between the current bar 12 and the clamping spring 13, an actuation element 14 is provided which is formed in two parts.

The actuation element 14 has a rotation element 15 and a lever element 16. The rotation element 15 is rotatable about a first axis of rotation 17 and the lever element 16 is rotatable about a second axis of rotation 18. The first axis of rotation 17 is arranged spaced apart from the second axis of rotation 18. The rotation element 15 and the lever element 16 are thus rotatable about axes of rotation 17, 18 positioned differently from one another.

The clamping spring 13 is arranged on the rotation element 15, so that, during a rotational movement of the rotation element 15, the clamping spring 13 is taken along at least in regions during a rotational movement of the rotation element 15.

Figure 4:
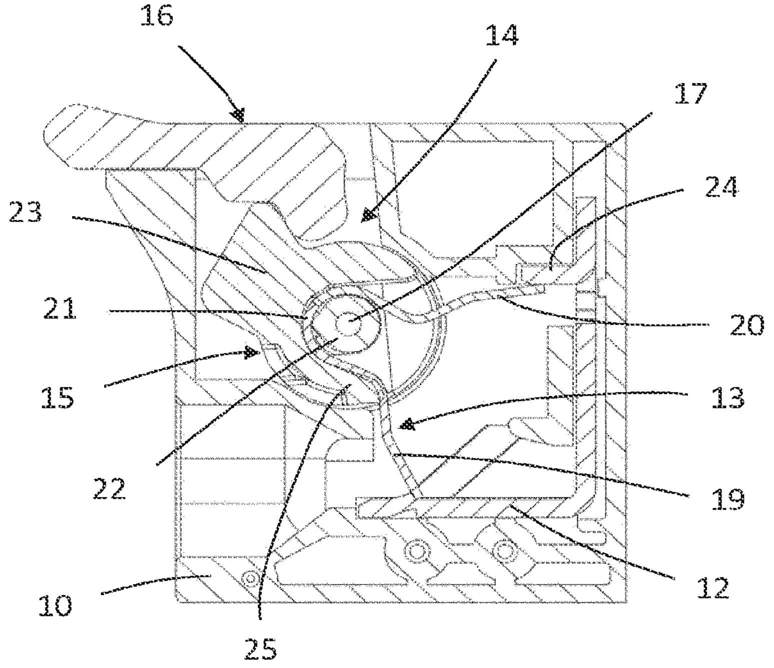
Figure 5:
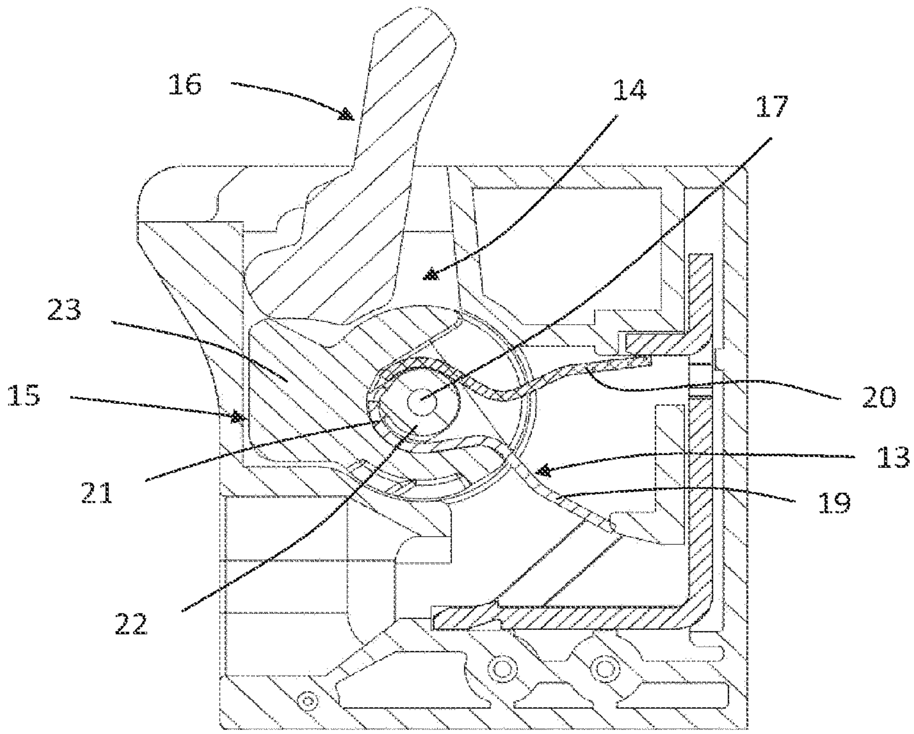
Figure 6:
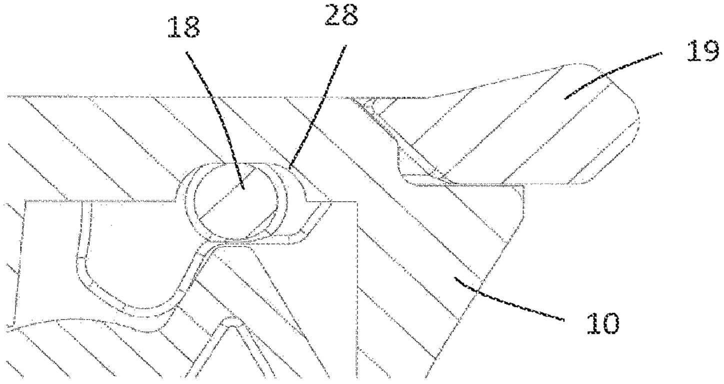

As can be seen in particular in the sectional views of FIGS. 4 and 5, the clamping spring 13 is designed as a leg spring. The clamping spring 13 has a clamping leg 19, a retaining leg 20 and an arc-shaped section 21 for connecting the clamping leg 19 to the retaining leg 20. With the arc-shaped section 21, the clamping spring 13 extends around the first axis of rotation 17 of the rotation element 15 in that the arc-shaped section 21 encompasses the first axis of rotation 17. The clamping leg 19 and the retaining leg 20 of the clamping spring 13 are arranged relative to one another in such a way that they form a V shape. By means of the clamping leg 19, the clamping spring 13 clamps the conductor to be connected against the current bar 12 in the clamping position. By means of the retaining leg 20, the clamping spring 13 is supported on the housing 10 of the connection terminal 100 or on a portion 24 of the current bar 12 as shown, for example, in FIG. 5.

As can be seen in the sectional view, the rotation element 15 can have an inner part 22 and an outer part 23. The inner part 22 is arranged radially inside the rotation element 15 and the outer part 23 is arranged radially outside, so that the outer part 23 radially surrounds the inner part 22. The inner part 22 can be fixed in place on the first axis of rotation 17, whereas the outer part 23 can be rotated relative to the inner part 22, and the rotation element 15 can thus be rotated about the first axis of rotation 17 via the outer part 23 of the rotation element 15. Via its arc-shaped section 21, the clamping spring 13 is positioned and fixed in place on the inner part 22.

The rotation element 15 or the outer part 23 of the rotation element 15 has a driver 25 that, during a rotational movement of the rotation element 15, can press against the clamping leg 19 of the clamping spring 13, so that the clamping spring 13 can follow the rotational movement of the rotation element 15 or the rotational movement of the outer part 23 of the rotation element 15. Here, the driver 25 is shaped like a finger.

During a transfer from the clamping position as shown in FIG. 4 into the open position as shown in FIG. 5, as a result of the rotational movement of the rotation element 15 and thus of the driver 25, the clamping leg 19 can be rotated or pressed in the direction of the retaining leg 20 of the clamping spring 13, so that the distance between the clamping leg 19 and the retaining leg 20 is reduced. The retaining leg 20 remains in its position when the clamping spring 13 is transferred into the open position and into the clamping position as shown in FIGS. 4 and 5.

Figure 2:
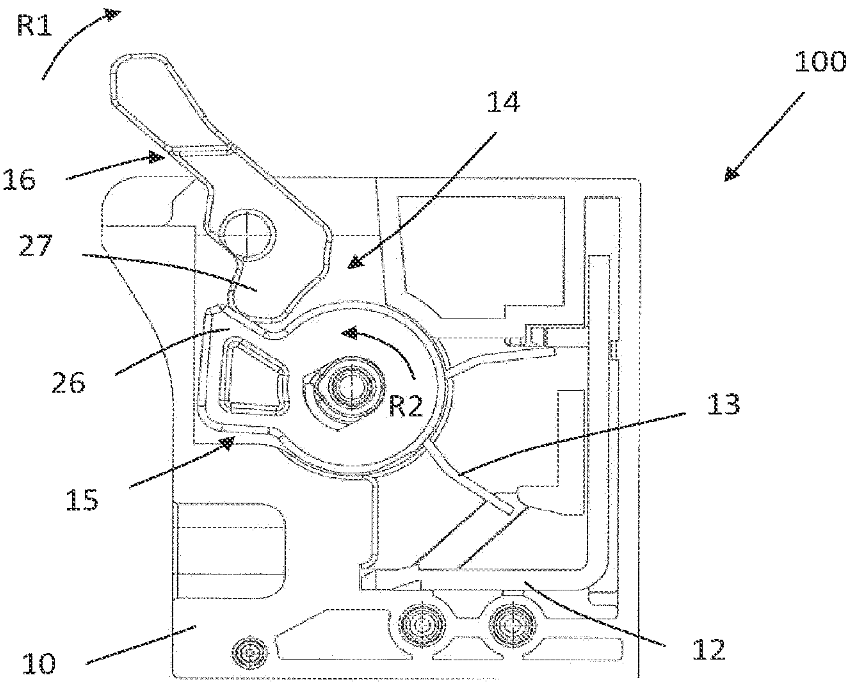

The rotation element 15 and the lever element 16 engage with one another in such a way that, during a rotational movement of the lever element 16 about the second axis of rotation 18, the rotation element 15 can be rotated about the first axis of rotation 17 arranged spaced apart from the second axis of rotation 18, in order to transfer the clamping spring 13 into the open position and into the clamping position as shown, for example, in FIGS. 1 to 3.

As indicated by the arrows in FIG. 2, the lever element 16 and the rotation element 15 interact with one another in such a way that, during a rotational movement of the lever element 16 in a direction of rotation R1, the rotation element 15 rotates about a direction of rotation R2 opposite the rotational movement of the lever element 16.

In order to be able to realize an interaction of the lever element 16 with the rotation element 15, in the embodiment shown in FIGS. 1 to 5, the rotation element 15 has a lug 26 and the lever element 16 also has a lug 27. The lug 26 of the rotation element 15 is formed on the outer part 23 of the rotation element 15. The lug 27 of the lever element 16 can press on the lug 26 of the rotation element 15, so that, during a rotational movement of the lever element 16, the lug 27 of the lever element 16 exerts a force on the lug 26 of the rotation element 15, so that the rotation element 15 also carries out a rotational movement. The two lugs 26, 27 are designed in such a way that, during a transfer into the open position and into the clamping position, the lug 27 of the lever element 16 can slide along the lug 26 of the rotation element 15, in order to transmit the rotational movement of the lever element 16 to the rotation element 15 as shown in FIGS. 1 to 3. The lugs 26, 27 thus each form actuating lugs.

In the embodiment of the connection terminal 100 shown in FIGS. 1 to 6, the lever element 16 is mounted in the floating manner in the housing 10 in that the second axis of rotation 18 of the lever element 16 is displaceably mounted in the housing 10. During a transfer into the clamping position and into the open position, the lever element 16 can thus carry out not only a rotational movement about the second axis of rotation 18 but also, simultaneously, a translational movement within the housing 10. As shown in the detailed view of FIG. 6, a guide contour 28 can be formed on the housing 10, within which guide contour the second axis of rotation 18 can be displaced, so that the displacement movement of the second axis of rotation 18 can take place in a controlled manner. The guide contour 28 here takes the form of an elongated recess on the housing 10.

As shown in FIGS. 1 to 3, the lever element 16 is rotatable by an angle $\alpha > 90°$. In this way, it can be achieved that, in the open position as shown in FIG. 3, the lever element 16, and thus the actuation element 14, automatically remains in this position without a user having to manually hold the actuation element 14 in the open position.

The lever element 16 has a handle region 29 via which a user can grip and actuate the lever element 16 and thus the actuation element 14. The handle region 29 projects out of the housing 10 in any position of the actuation element 14 or of the lever element 16. As shown, for example, in FIG. 1, in the clamping position, the handle region 29 extends in parallel to the conductor insertion opening 11 in the housing 10.

Figure 7:
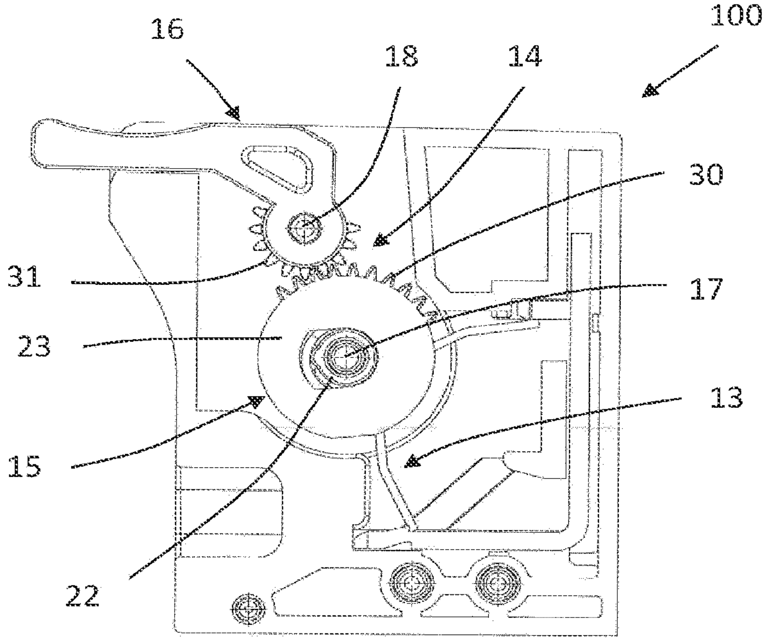
Figure 8:
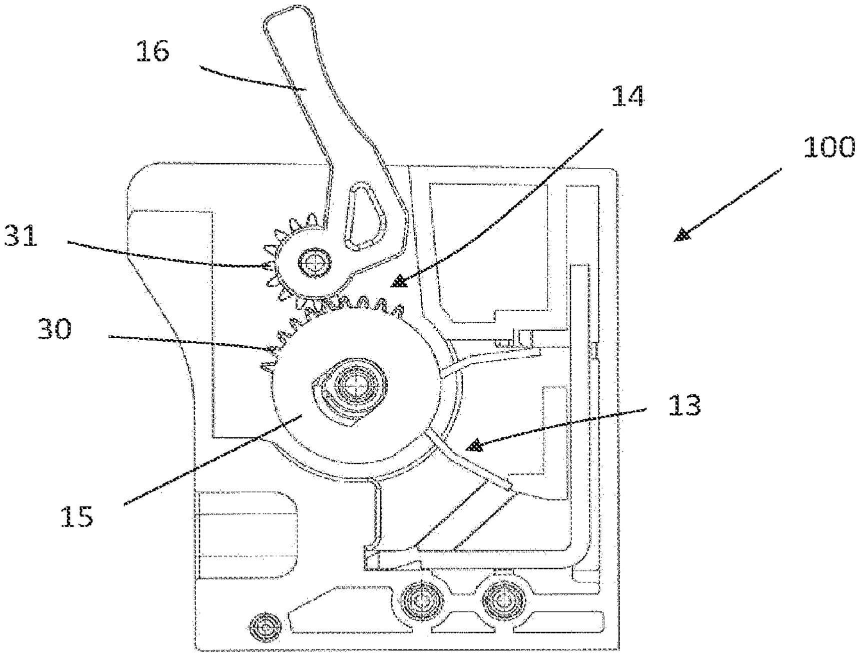

FIGS. 7 and 8 show a further embodiment of a connection terminal 100, wherein the connection terminal 100 in FIGS. 7 and 8 essentially only differs from the embodiment shown in FIGS. 1 to 5 by the manner of engagement of the lever element 16 with the rotation element 15. In the embodiment shown in FIGS. 7 and 8, the rotation element 15 has a plurality of teeth 30 and the lever element 16 also has a plurality of teeth 31, wherein the teeth 30 of the rotation element 15 engage in the teeth 31 of the lever element 16, so that the teeth 30, 31 form a gearing via which a transmission of the rotational movement of the lever element 16 to the rotation element 15 takes place.

Figure 9:
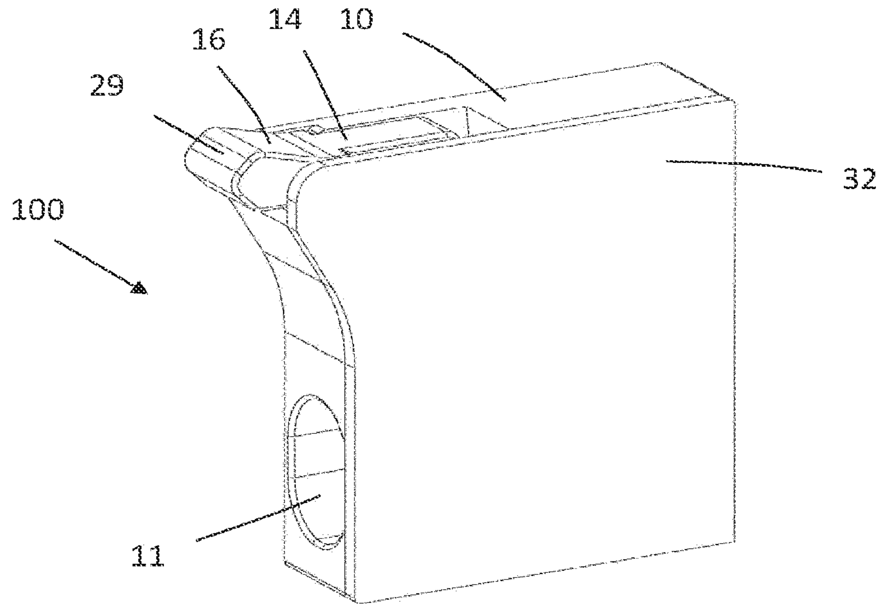

In the embodiments shown in FIGS. 1 to 8, the housing 10 of the connection terminal 100 is designed to be open on one side. FIG. 9 shows an embodiment in which a side part 32 is placed onto the housing 10, in order to close the housing 10. The side part 32 is plate-shaped.

Figure 10:
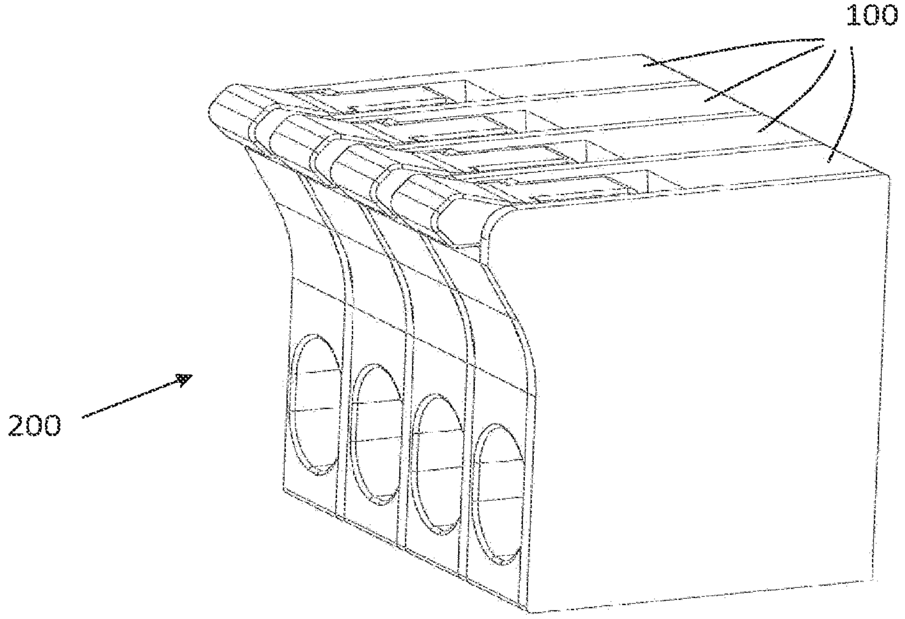

FIG. 10 shows a connection terminal block 200 in which a plurality of connection terminals 100 as shown in FIGS. 1 to 9 are arranged in a row.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection terminal
10 Housing
11 Conductor insertion opening
12 Current bar
13 Clamping spring
14 Actuation element
15 Rotation element
16 Lever element
17 First axis of rotation
18 Second axis of rotation
19 Clamping leg
20 Retaining leg
21 Arc-shaped section
22 Inner part
23 Outer part
24 Portion
25 Driver
26 Lug
27 Lug
28 Guide contour
29 Handle region
30 Teeth
31 Teeth
32 Side part
200 Connection terminal block
R1 Direction of rotation
R2 Direction of rotation

The invention claimed is:

1. A connection terminal for connecting an electric conductor, comprising:

a housing;

a current bar arranged in the housing;

a clamping spring arranged in the housing configured to clamp the conductor to be connected against the current bar; and an actuation element configured to transfer the clamping spring into a clamping position and into an open position, wherein the actuation element has a rotation element mounted about a first axis of rotation and a lever element mounted about a second axis of rotation, wherein the clamping spring is mounted on the rotation element and the clamping spring is configured to follow a rotational movement of the rotation element at least in regions, wherein the rotation element is configured to engage with the lever element such that during a rotational movement of the lever element about the second axis of rotation, the rotation element is configured to rotate about the first axis of rotation arranged spaced apart from the second axis of rotation, and the clamping spring is configured to be transferred into the open position and into the clamping position, and wherein the clamping spring is mounted on the rotation element such that the clamping spring extends around the first axis of rotation.

2. The connection terminal of claim 1, wherein the clamping spring comprises a leg spring.

3. The connection terminal of claim 1, wherein the lever element and the rotation element are configured to interact such that during the rotational movement of the lever element in a first direction of rotation, the rotation element is configured to rotate about a second direction of rotation opposite the rotational movement of the lever element.

4. The connection terminal of claim 1, wherein the second axis of rotation of the lever element is displaceably mounted in the housing.

5. The connection terminal of claim 1, wherein the rotation element has a lug configured to engage with a lug of the lever element.

6. The connection terminal of claim 1, wherein the rotation element has a plurality of teeth and the lever element has a plurality of teeth, and wherein the teeth of the rotation element are configured to engage with the teeth of the lever element.

7. The connection terminal of claim 1, wherein the lever element is rotatable by an angle $\alpha > 90°$.

8. The connection terminal of claim 1, wherein the lever element has a handle region projecting out of the housing.

9. The connection terminal of claim 1, wherein the connection terminal comprises a series terminal configured to be snapped onto a support rail.

10. A connection terminal block, comprising at least two connection terminals that are arranged in a row, each of the at least two connection terminals comprising the connection terminal of claim 1.

* * * * *